(12) United States Patent
Matsunaga

(10) Patent No.: US 10,208,635 B2
(45) Date of Patent: Feb. 19, 2019

(54) COMPOSITE STRUCTURE AND VALVE TIMING ADJUSTMENT DEVICE HAVING THE SAME

(71) Applicant: DENSO CORPORATION, Kariya, Aichi-pref. (JP)

(72) Inventor: Yuuki Matsunaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/569,189

(22) PCT Filed: Aug. 22, 2016

(86) PCT No.: PCT/JP2016/074316
§ 371 (c)(1),
(2) Date: Oct. 25, 2017

(87) PCT Pub. No.: WO2017/043293
PCT Pub. Date: Mar. 16, 2017

(65) Prior Publication Data
US 2018/0106168 A1    Apr. 19, 2018

(30) Foreign Application Priority Data
Sep. 11, 2015   (JP) ................. 2015-180001

(51) Int. Cl.
| F01L 1/34 | (2006.01) |
| F01L 1/356 | (2006.01) |
| F16B 5/02 | (2006.01) |
| F01L 1/344 | (2006.01) |
| F16B 17/00 | (2006.01) |

(52) U.S. Cl.
CPC ............. *F01L 1/356* (2013.01); *F01L 1/3442* (2013.01); *F16B 5/02* (2013.01); *F16B 5/0216* (2013.01); *F16B 5/0275* (2013.01); *F16B 17/004* (2013.01); *F01L 2001/34433* (2013.01); *F01L 2001/34469* (2013.01);
(Continued)

(58) Field of Classification Search
CPC ........ F16B 5/02; F16B 5/0216; F16B 5/0275; F01L 1/356; F01L 1/3442; F01L 2001/34433; F01L 2001/34469
USPC ............................. 123/90.15, 90.17
See application file for complete search history.

(56) References Cited

U.S. PATENT DOCUMENTS 7,162,984 B2 *   1/2007   Sato ................. F01L 1/022
                                               123/90.15

FOREIGN PATENT DOCUMENTS

| JP | 2000-240628 | 9/2000 |
| JP | 2009-215881 | 9/2009 |

* cited by examiner

*Primary Examiner* — Ching Chang
(74) *Attorney, Agent, or Firm* — Nixon & Vanderhye P.C.

(57) ABSTRACT

A composite structure includes: a cover plate having a countersunk hole and a plate side fitting hole; a bearing plate having a screw hole and a screw side fitting hole located opposite from the plate side fitting hole through the screw hole; and a plate screw component including a screw part engaged with the screw hole, and a plate side fitting part and a screw side fitting part respectively fitted with the plate side fitting hole and the screw side fitting hole to be in alignment with each other. A difference δϕa in diameter between the plate side fitting hole and the plate side fitting part, a difference δϕb in diameter between the screw side fitting hole and the screw side fitting part, and an effective difference δϕc in diameter between the screw hole and the screw part satisfy a dimensional relation of δϕa<δϕc and δϕb<δϕc.

6 Claims, 13 Drawing Sheets

(52) U.S. Cl.
CPC ....... *F01L 2103/00* (2013.01); *F01L 2103/02* (2013.01); *F01L 2250/02* (2013.01); *F01L 2820/02* (2013.01)

FIG. 10
(a)
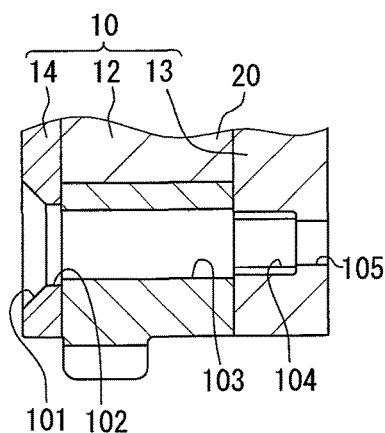
(b)
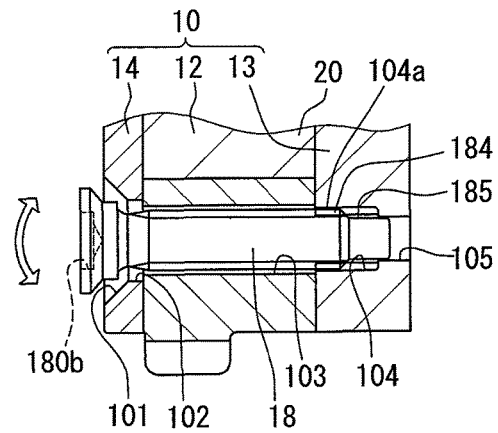
(c)
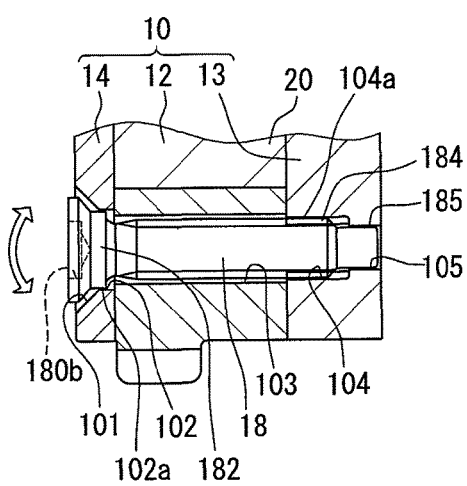
(d)
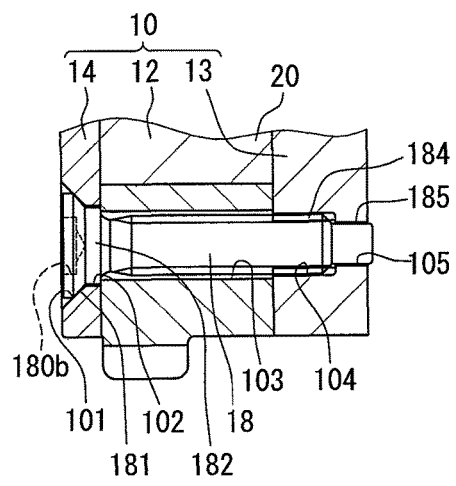

COMPOSITE STRUCTURE AND VALVE TIMING ADJUSTMENT DEVICE HAVING THE SAME

CROSS REFERENCE TO RELATED APPLICATION

This application is the U.S. national phase of International Application No. PCT/JP2016/074316 filed on Aug. 22, 2016 which designated the U.S. and claims priority to Japanese Patent Application No. 2015-180001 filed on Sep. 11, 2015, the entire contents of each of which are incorporated herein by reference.

TECHNICAL FIELD

The present disclosure relates to a composite structure and a valve timing adjustment device having the composite structure.

BACKGROUND ART

Conventionally, a composite structure is widely known, which is defined by tightening a countersunk hole component having a countersunk hole and a screw hole component having a screw hole by a plate screw component. In this art, a male thread of the plate screw component is engaged with a female thread of the screw hole component, such that a seat part of the plate screw component having a taper surface shape is seated on the countersunk hole of the countersunk hole component shaped in the taper surface shape. Thus, the countersunk hole component and the screw hole component are connected with each other. Accordingly, it becomes possible to downsize the composite structure in the axial direction of the plate screw component.

Patent Literature 1 discloses a valve timing adjustment device as an example in which such a technology is applied. In the valve timing adjustment device disclosed in Patent Literature 1, an outer rotor rotating with a crankshaft is configured by a composite structure, in which an inner rotor rotating with a camshaft is relatively rotated inside the outer rotor.

PRIOR ART LITERATURES

Patent Literature

Patent Literature 1: JP 2009-215881 A

SUMMARY OF INVENTION

However, in the valve timing adjustment device disclosed in Patent Literature 1, if an axis of a countersunk hole of a countersunk hole component and an axis of a screw hole of a screw hole component are not in alignment with each other, the plate screw component inserted in the holes will incline. As a result, since the tightening axial tension by the plate screw component becomes smaller than an expected axial tension, the durability of a composite structure is lowered, therefore, the durability of a valve timing adjustment device will fall. If the countersunk hole of the countersunk hole component and the screw hole of the screw hole component are accurately made in alignment before inserting the plate screw component, the productivity will fall, since the alignment work becomes complicated.

It is an object of the present disclosure to provide a composite structure and a valve timing adjustment device having the same, which achieve both high productivity and high durability.

According to an aspect of the present disclosure, a composite structure includes: a countersunk hole component having a countersunk hole shaped in a tapered hole and a plate side fitting hole defined adjacent to a small diameter side of the countersunk hole; a screw hole component having a screw hole shaped in a female thread and a screw side fitting hole defined opposite from the plate side fitting hole through the screw hole; and a plate screw component including a seat part having a tapered surface shape seated on the countersunk hole, a screw part shaped in a male thread and engaged with the screw hole, and a plate side fitting part and a screw side fitting part respectively fitted with the plate side fitting hole and the screw side fitting hole to be in alignment with each other. A difference $\delta\phi a$ in diameter between the plate side fitting hole and the plate side fitting part, a difference $\delta\phi b$ in diameter between the screw side fitting hole and the screw side fitting part, and an effective difference $\delta\phi c$ in diameter between the screw hole and the screw part satisfy a dimensional relation of $\delta\phi a<\delta\phi c$ and $\delta\phi b<\delta\phi c$.

The male thread of the plate screw component is engaged with the female thread of the screw hole component, such that the seat part of the plate screw component having the taper surface shape is seated on the countersunk hole of the countersunk hole component shaped in the taper surface shape. Thus, the countersunk hole component and the screw hole component are connected with each other. At the time of this connection, the plate side fitting part and the screw side fitting part of the plate screw component are respectively fitted to the plate side fitting hole of the countersunk hole component and the screw side fitting hole of the screw hole component, to be individually in alignment with the fitting holes.

The difference $\delta\phi a$ in diameter between the plate side fitting hole and the plate side fitting part, the difference $\delta\phi b$ in diameter between the screw side fitting hole and the screw side fitting part, and the effective difference $\delta\phi c$ in diameter between the screw hole and the screw part satisfy the dimensional relation of $\delta\phi a<\delta\phi c$ and $\delta\phi b<\delta\phi c$. As a result, the alignment function by each of the fitting parts fitting to the corresponding fitting hole is not affected by the engagement between the screw hole and the screw part. Therefore, according to the alignment function, the plate side fitting hole and the screw side fitting hole can be aligned through the plate screw component, such that the countersunk hole and the screw hole can be also aligned with each other.

Thus, while fixing the countersunk hole component and the screw hole component by the plate screw component, the countersunk hole and the screw hole can be aligned with each other, such that the inclination of the plate screw component to the holes can be controlled. Therefore, while improving the productivity by omitting the alignment work between the countersunk hole and the screw hole before the connection, it is possible to improve the durability by securing the tightening axial tension of the plate screw component by restricting the inclination.

According to an aspect of the present disclosure, a valve timing adjustment device that adjusts valve timing of a valve opening and closing a camshaft in an internal-combustion engine by a crank torque from a crankshaft, the valve timing adjustment device including: an outer rotor defined by the composite structure and rotating with the crankshaft; and an inner rotor housed in the outer rotor to relatively rotate, the inner rotor rotating with the camshaft.

The outer rotor is the composite structure, in order to relatively rotate the inner rotor rotating with the camshaft, inside the outer rotor rotating with the crankshaft. Therefore, when the outer rotor is produced as a composite structure housing the inner rotor inside, it is possible to achieve both improving the productivity and improving the durability.

BRIEF DESCRIPTION OF DRAWINGS

FIG. 10 is a schematic view for explaining a production method of the valve timing adjustment device of FIG. 1.

DESCRIPTION OF EMBODIMENTS

An embodiment is described based on the drawings.

Figure 1:
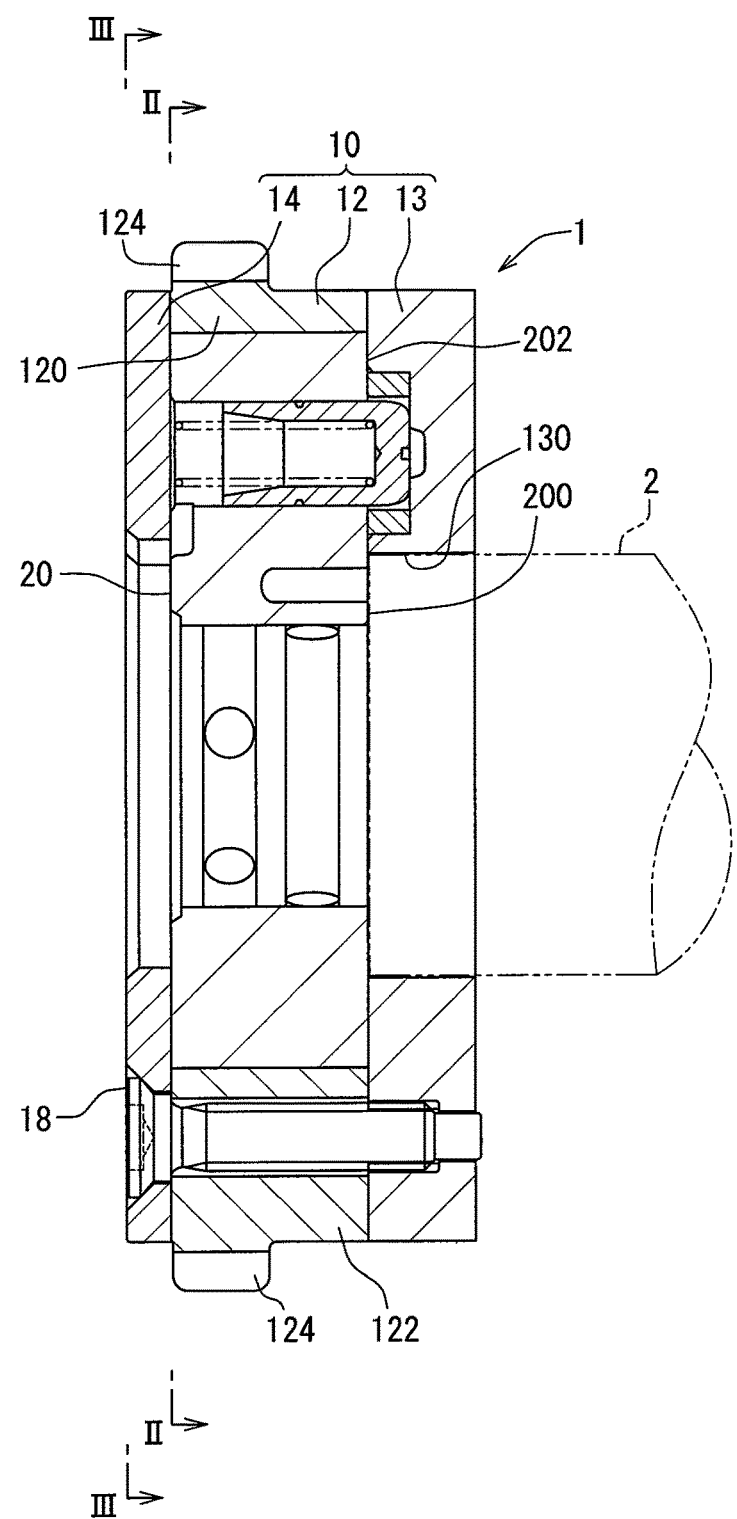
FIG. 1 is a sectional view illustrating a valve timing adjustment device according to an embodiment, taken along a line I-I of FIG. 2.

As shown in FIG. 1, a valve timing adjustment device 1 according to the embodiment is a hydraulic device using pressure of operation oil. The device 1 is installed in a transfer system in which a crank torque output from a crankshaft is transferred to a camshaft 2 in an internal-combustion engine. The camshaft 2 drives an intake valve as "a valve" to open and close by the transfer of the crank torque from the crankshaft. Then, the device 1 adjusts the valve timing of the intake valve.

Figure 2:
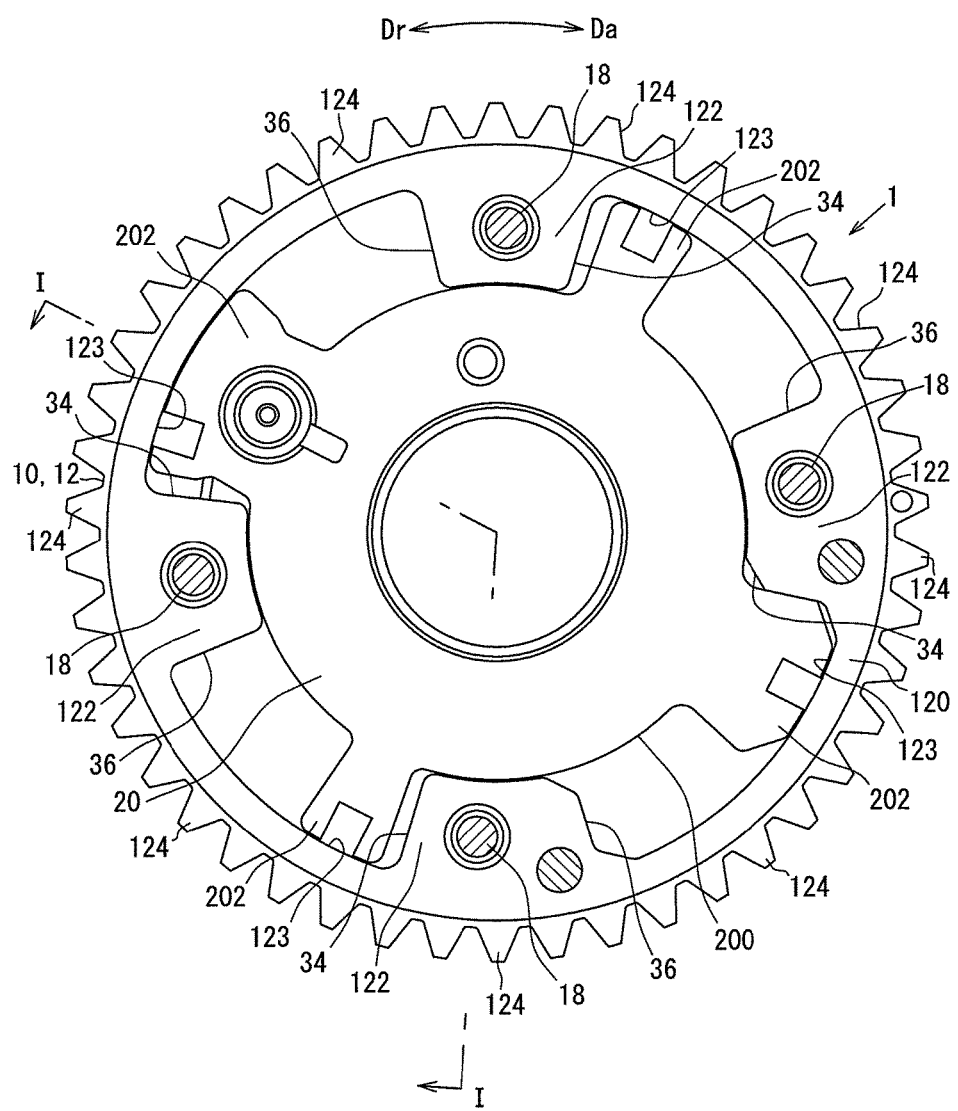
FIG. 2 is a sectional view taken along a line II-II of FIG. 1.
Figure 3:
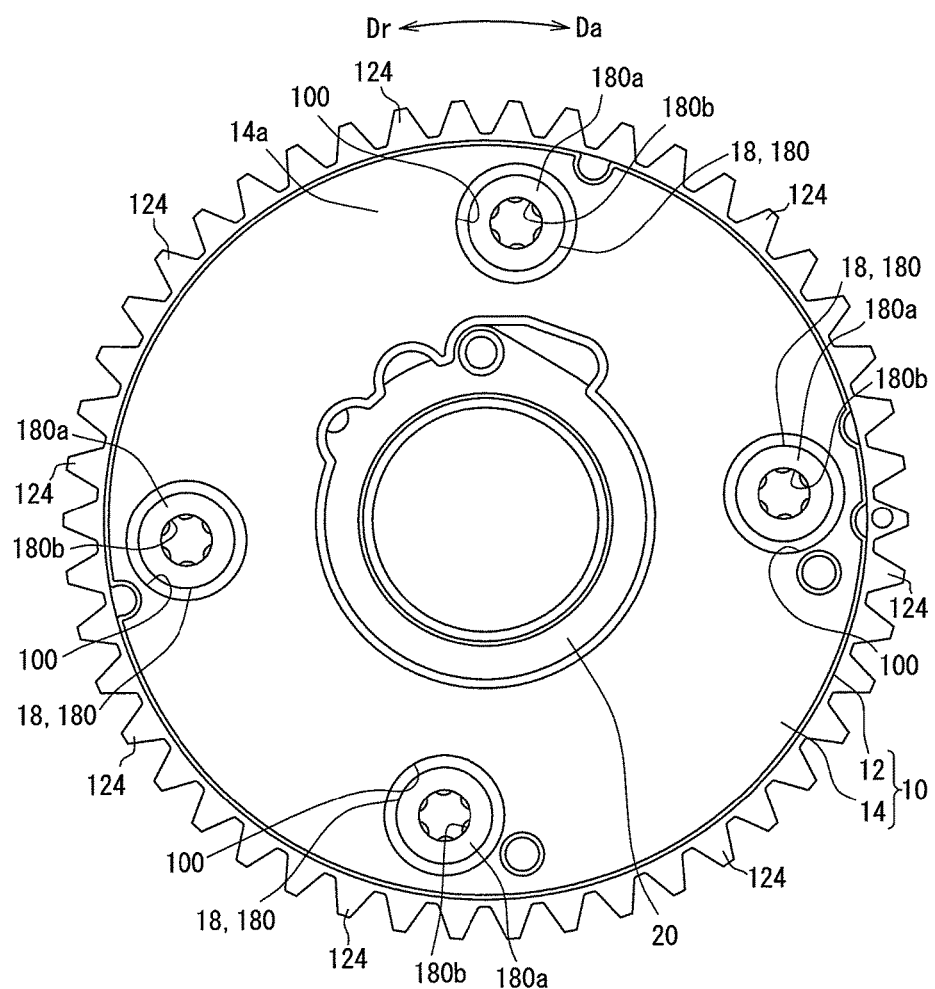
FIG. 3 is a view seen in an arrow line of FIG. 1.

As shown in FIGS. 1-3, the device 1 includes an outer rotor 10 and an inner rotor 20. The device 1 adjusts the valve timing according to the rotation phase between the rotors 10 and 20, by relatively rotating the inner rotor 20 with operation oil inside the outer rotor 10.

The outer rotor 10 is made of metal, and is what is called a housing rotor, specifically, defined by connecting a bearing plate 13 and a cover plate 14, respectively, to both sides of a timing sprocket 12 in the axial direction. In the outer rotor 10, the bearing plate 13, the cover plate 14, and the timing sprocket 12 disposed between the bearing plate 13 and the cover plate 14 are tightened with each other by plural plate screw components 18. The plate screw components 18 are arranged in a circumferential direction at a predetermined interval. The circumferential direction is common among the timing sprocket 12 shaped in cylindrical, and the plates 13 and 14 shaped in ring board. As mentioned above, the outer rotor 10 corresponds to a "composite structure" including the elements 12, 13, 14, and 18.

As shown in FIGS. 1 and 2, the timing sprocket 12 has a housing pipe 120 and plural shoes 122. Each of the shoes 122 is projected from the housing pipe 120 inward in the radial direction, and has the shape of an approximately sector, at positions arranged in the circumferential direction at the predetermined interval. As shown in FIG. 2, a housing chamber 123 is formed between the shoes 122 adjacent to each other in the circumferential direction.

As shown in FIGS. 1-3, the timing sprocket 12 further has sprocket teeth 124. Each of the sprocket teeth 124 is projected from the housing pipe 120 outward in the radial direction, and has the shape of an approximately sector, at positions arranged in the circumferential direction at regular intervals. The timing sprocket 12 is liked with the crankshaft by a timing chain engaged between the sprocket teeth 124 and teeth of the crankshaft. Thereby, the timing sprocket 12 receives the crank torque from the crankshaft through the timing chain at the operation time of an internal-combustion engine. At this time, the components 12, 13, 14, and 18 of the outer rotor 10 are rotated integrally with the crankshaft to one side (clockwise in FIGS. 2 and 3) in the circumferential direction.

As shown in FIG. 1, the camshaft 2 is fitted in the central hole 130 of the bearing plate 13. Thereby, the bearing plate 13 is supported by the camshaft 2 as a bearing. The inner circumference surface of the central hole 130 of the bearing plate 13 is made to slide on the outer circumference surface of the camshaft 2 at the time of the relative rotation between the rotors 10 and 20.

As shown in FIGS. 1 and 2, the inner rotor 20 made of metal is what is called a vane rotor housed in the outer rotor 10. The inner rotor 20 has a rotation shaft 200 and plural vanes 202.

The rotation shaft 200 is arranged coaxially inside the outer rotor 10. The rotation shaft 200 is coaxially connected to the camshaft 2. Thereby, the inner rotor 20 is able to rotate relative to the outer rotor 10 to both sides in the circumferential direction, while rotating with the camshaft 2 to one side (clockwise in FIG. 2) in the circumferential direction. The rotation shaft 200 has one end surface and the other end surface in the axial direction, and the one end surface and the other end surface are made to slide on the bearing plate 13 and the cover plate 14, respectively, at the time of the relative rotation between the rotors 10 and 20. Further, the outer circumference surface of the rotation shaft 200 in the radial direction is made to slide on the tip end surface of each shoe 122.

As shown in FIG. 2, each vane 202 is projected from the rotation shaft 200 outward in the radial direction, and has the shape of an approximately sector, at positions arranged in the circumferential direction at the predetermined interval. Each vane 202 is located in the corresponding housing chamber 123. Each vane 202 has one end surface and the other end surface in the axial direction, and the one end surface and the other end surface are made to slide on the bearing plate 13 and the cover plate 14, respectively, at the time of the relative rotation between the rotors 10 and 20. Further, a tip end surface of each vane 202 in the radial direction is made to slide on the inner circumference surface of the housing pipe 120.

Inside of the outer rotor 10, each vane 202 divides the corresponding housing chamber 123 in the circumferential direction to define advance operation chambers 34 and retard operation chambers 36. When the operation oil discharged from a pump is introduced into each of the advance operation chambers 34 by the operation of an oil pressure control valve, in an internal-combustion engine, a running torque is generated to relatively rotate the inner rotor 20 to the advance side Da in the circumferential direction relative to the outer rotor 10. At this time, in the internal-combustion engine, operation oil is discharged by the operation of the oil pressure control valve from each of the retard operation chambers 36 to a drain, such that the rotation phase of the inner rotor 20 to the outer rotor 10 is advanced to advance the valve timing.

When the operation oil discharged from the pump is introduced by the operation of the oil pressure control valve in the internal-combustion engine into each of the retard operation chambers 36, a running torque is generated to relatively rotate the inner rotor 20 to the retard side Dr in the circumferential direction relative to the outer rotor 10. At this time, in the internal-combustion engine, operation oil is discharged by the operation of the oil pressure control valve from each of the advance operation chambers 34 in the internal-combustion engine to a drain, such that the rotation phase of the inner rotor 20 to the outer rotor 10 is retarded to retard the valve timing.

(Connection Structure)

Next, the connection structure of the elements 12, 13, and 14 by the plate screw component 18 is explained. In this embodiment, each configuration and its connection structure is substantially the same among the plate screw components 18. So, the typical configuration and its connection structure, shown in FIGS. 4 and 5, among the plate screw components 18 are explained below.

Figure 4:
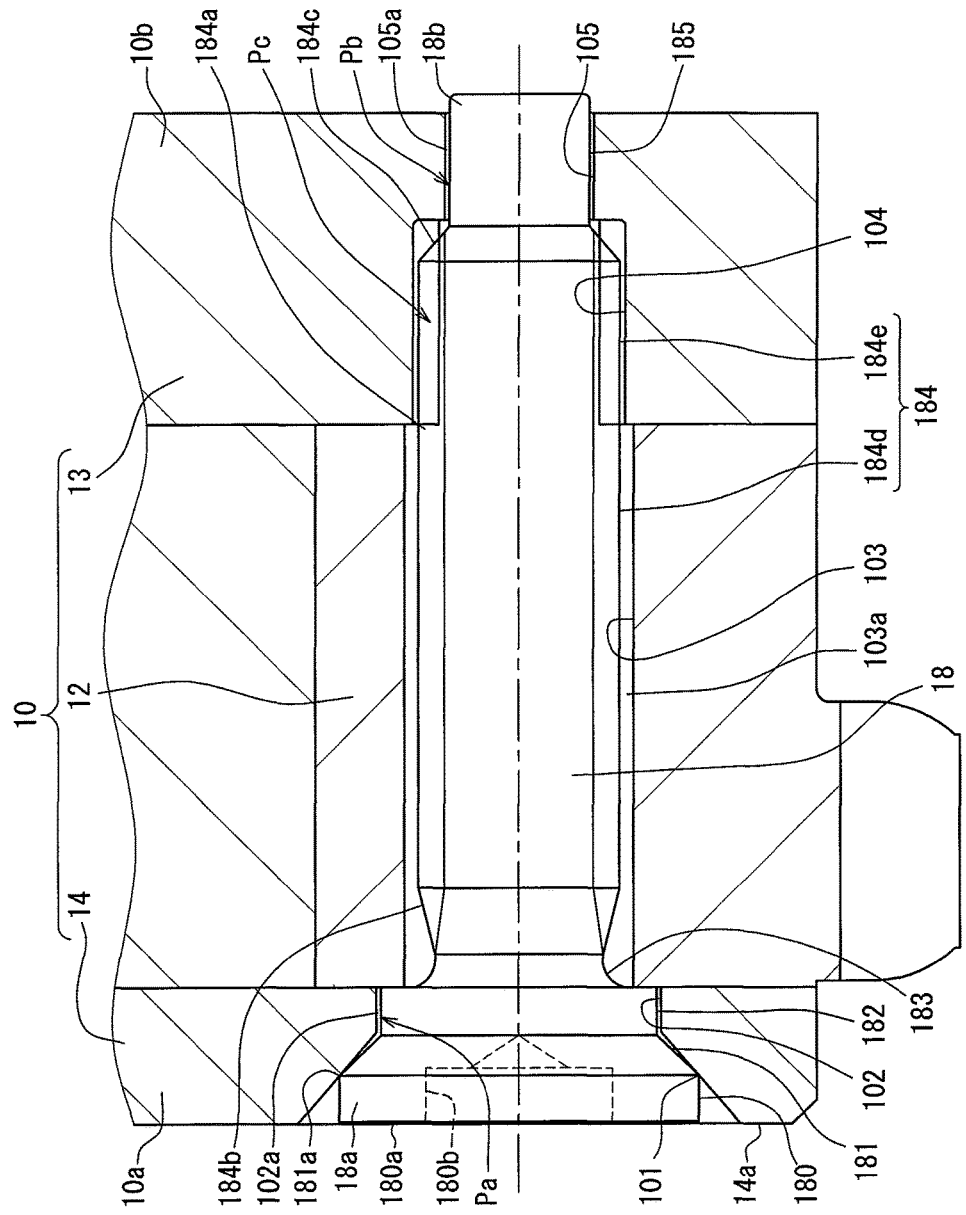
FIG. 4 is an enlarged sectional view illustrating a connection structure by a plate screw component of FIG. 1.
Figure 5:
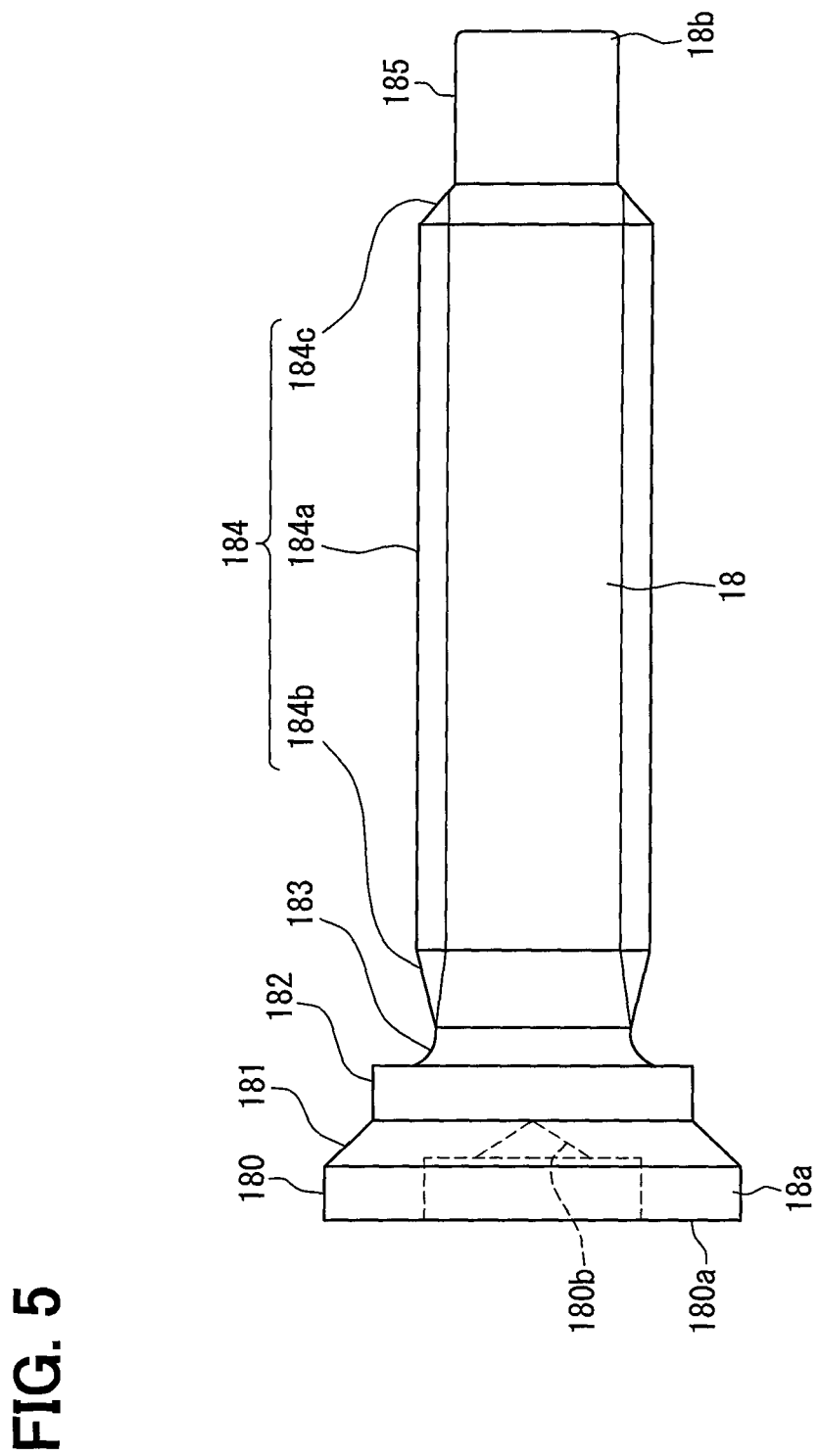
FIG. 5 is an enlarged side view illustrating the plate screw component of FIG. 1.

As shown in FIGS. 4 and 5, the plate screw component 18 is formed in a long rod shape, and is made of metal. The plate screw component 18 has a countersunk head part 180, a seat part 181, a plate side fitting part 182, a connection part 183, a screw part 184, and a screw side fitting part 185 in this order from one end 18a to the other end 18b in the longitudinal direction. The components 180, 181, 182, 183, 184, 185 are formed coaxially in the plate screw component 18.

The countersunk head part 180 is formed in a disk shape at the one end 18a. The countersunk head part 180 has a diameter which is approximately uniform in the longitudinal direction. An end surface 180a of the countersunk head part 180 opposite from the plate side fitting part 182 has a star-shaped hole 180b which is a blind hole (refer to FIGS. 3, 4, and 5). A star-shaped stick spanner is put in the star-shaped hole 180b at the time of connection. The end surface 180a of the countersunk head part 180 may have a hole shaped in square, hexagon, cross, etc. instead of the star-shaped hole 180b, according to the kind of the stick spanner or screwdriver put at the time of connection.

The seat part 181 is formed in the shape of a taper surface, coaxially adjoins on the countersunk head part 180. The diameter of the seat part 181 is gradually decreased toward the other end 18b in the longitudinal direction from the countersunk head part 180. Thereby, the maximum diameter of the seat part 181 is approximately equal to the diameter of the countersunk head part 180.

The plate side fitting part 182 is formed cylindrical, coaxially adjoins on the seat part 181. The plate side fitting part 182 has a diameter approximately uniform in the longitudinal direction, in other words, straightly extended in the longitudinal direction. The diameter of the plate side fitting part 182 is approximately equal to the minimum diameter of the seat part 181.

The connection part 183 is formed in the shape of a taper surface, coaxially adjoins on the plate side fitting part 182. The diameter of the connection part 183 is gradually decreased toward the other end 18b in the longitudinal direction from the plate side fitting part 182. Thereby, the maximum diameter of the connection part 183 is set to be smaller than the diameter of the plate side fitting part 182.

The screw part 184 is formed in the shape of a male thread, coaxially adjoins on the connection part 183. The screw part 184 has a perfect screw part 184a between a pair of imperfect screw parts 184b and 184c in the longitudinal direction. The perfect screw part 184a is a portion of a male thread having thread crest and thread root shaped in a perfect expected form. The imperfect screw part 184b, 184c is a portion of a male thread having thread crest and thread root not shaped in the expected form, due to a chamfering part or taper lead.

The diameter of the crest thread in the screw part 184 is set to be larger than the minimum diameter of the connection part 183 and to be smaller than the plate side fitting part 182. The diameter of the crest thread in the screw part 184 means a diameter of a virtual cylinder which is in contact with the top of the crest thread of the male thread.

The screw side fitting part 185 is formed in a cylindrical column shape at the other end 18b, coaxially adjoins on the imperfect screw part 184c, opposite from the connection part 183 through the screw part 184. The screw side fitting part 185 has a diameter uniform in the longitudinal direction, and is straightly extended in the longitudinal direction. The axial length of the screw side fitting part 185 is set longer than the axial length of the plate side fitting part 182. The diameter of the screw side fitting part 185 is set smaller than the diameter of the space between threads in the screw part 184. The diameter of the space between threads in the screw part 184 means a diameter of a virtual cylinder in contact with the bottom of the thread root of the male thread.

The plate screw component 18 having the elements 180, 181, 182, 183, 184, 185 is attached to the other components 12, 13, 14 of the rotor 10, as shown in FIG. 4, as the form extended along the axial direction of the outer rotor 10. Then, for this attachment, the outer rotor 10 has a countersunk hole 101, a plate side fitting hole 102, a loose fit hole 103, a screw hole 104, and a screw side fitting hole 105 in this order toward the other end 10b from the one end 10a in the axial direction. The holes 101, 102, 103, 104, 105 are coaxially formed in the outer rotor 10.

Specifically, the countersunk hole 101 and the plate side fitting hole 102 are defined in the cover plate 14 of the outer rotor 10 corresponding to a "countersunk hole component" made of metal. The loose fit hole 103 is formed in the timing sprocket 12 of the outer rotor 10 corresponding to a "loose fit hole component" made of metal. The screw hole 104 and the screw side fitting hole 105 are defined in the bearing plate 13 of the outer rotor 10 corresponding to a "screw hole component" made of metal.

The countersunk hole 101 as what is called counterboring is formed in the shape of a taper bore, at a portion of the cover plate 14 which defines the one end 10a. The diameter of the countersunk hole 101 is gradually decreased toward the other end 10b in the axial direction from the end surface 14a of the cover plate 14 opposite from the plate side fitting hole 102 (refer to FIGS. 3 and 4).

The countersunk head part 180 and the seat part 181 are coaxially inserted in the countersunk hole 101. In this state, the maximum diameter of the countersunk hole 101 is set larger than the diameter of the countersunk head part 180 and the maximum diameter of the seat part 181. Further, the minimum diameter of the countersunk hole 101 is set larger than the minimum diameter of the seat part 181. Furthermore, the taper angle of the countersunk hole 101 is set smaller than the taper angle of the seat part 181. Due to the setup in diameter and angle, an edge part (namely, the maximum diameter part) 181a of the seat part 181 relative to the countersunk head part 180 is in line contact with the inner circumference surface of the countersunk hole 101 in an annular shape, such that the seat part 181 is seated on the countersunk hole 101.

The plate side fitting hole 102 is formed in the shape of a cylindrical bore, coaxially adjoins on the countersunk hole 101. The plate side fitting hole 102 has a diameter approximately uniform in the axial direction, and is straightly extended in the axial direction in the cover plate 14 adjacent to the other end 10b than the one end 10a. The plate side fitting hole 102 is located adjacent to the small diameter side of the countersunk hole 101. Thereby, the diameter of the plate side fitting hole 102 is approximately equal to the minimum diameter of the countersunk hole 101.

The plate side fitting part 182 is coaxially inserted in the plate side fitting hole 102. Under this insertion state, the diameter of the plate side fitting hole 102 is set larger than the diameter of the plate side fitting part 182 only by a minute clearance 102a (refer to FIGS. 4 and 6). Due to this diameter setup, the plate side fitting part 182 can be aligned with the plate side fitting hole 102 by being fitted into the plate side fitting hole 102. Then, the minute clearance 102a is secured as a fitting clearance for permitting the alignment function between the plate side fitting part 182 and the plate side fitting hole 102.

The loose fit hole 103 is formed in the shape of a cylindrical bore, coaxially adjoins on the plate side fitting hole 102. The plate side fitting hole 102 has a diameter approximately uniform in the axial direction, and is extended straightly in the axial direction within the whole region of the timing sprocket 12. The diameter of the loose fit hole 103 is set smaller than the diameter of the plate side fitting hole 102.

The connection part 183 is coaxially inserted in the loose fit hole 103. Further, a loose fit portion 184d which is a specific portion of the screw part 184 is coaxially inserted in the loose fit hole 103. In this embodiment, the loose fit portion 184d inserted in the loose fit hole 103 consists of the imperfect screw part 184b adjacent to the connection part 183 and a part of the perfect screw part 184a adjacent to the imperfect screw part 184b.

Figure 7:
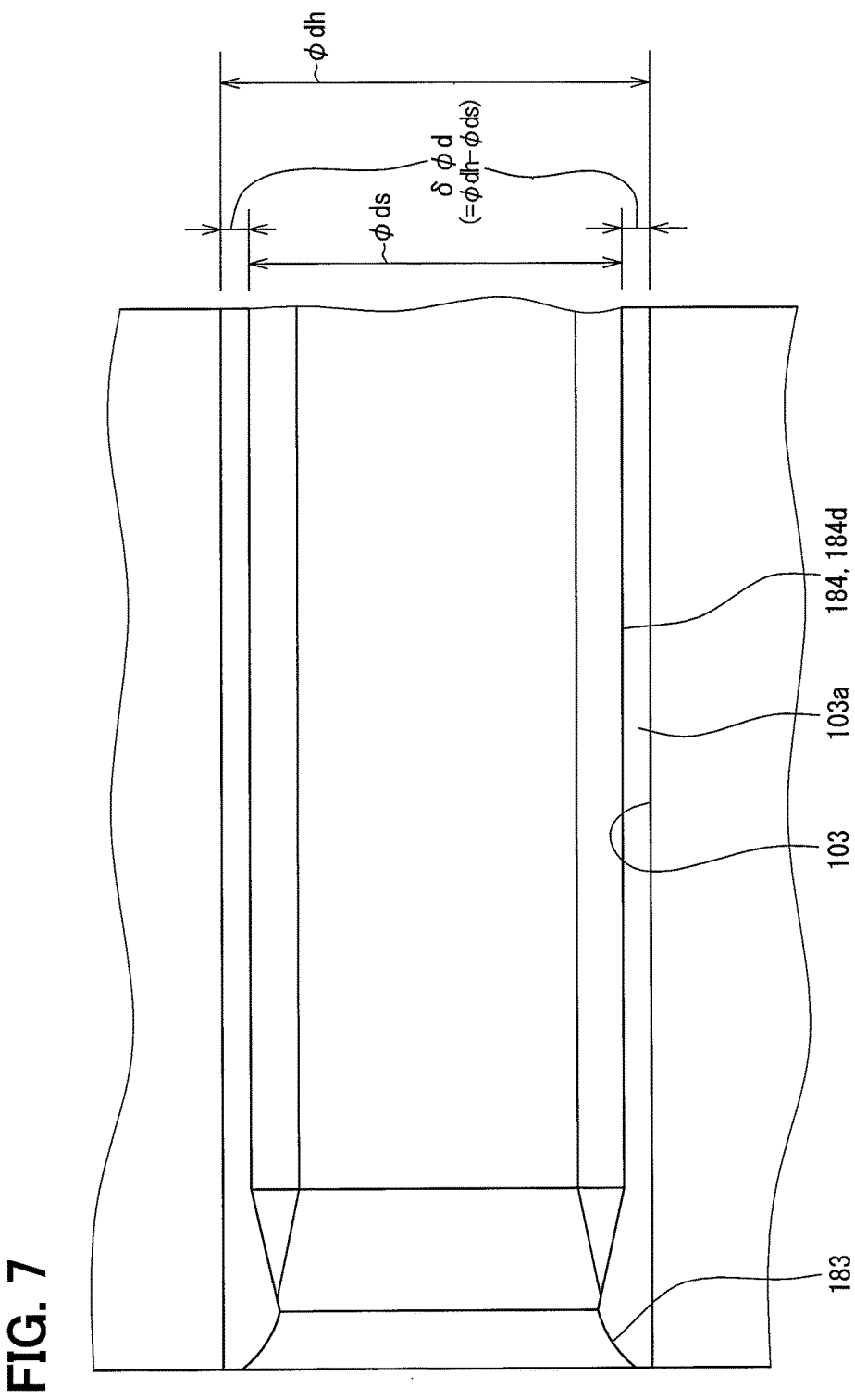
FIG. 7 is a schematic view for explaining a dimensional relation of the connection structure by the plate screw component of FIG. 1.

Under such insertion state, the diameter of the loose fit hole 103 is set larger than the maximum diameter of the connection part 183 and the diameter of the crest thread of the screw part 184, only by a cylindrical clearance 103a (refer to FIGS. 4 and 7). The cylindrical clearance 103a is secured sufficiently larger than the minute clearance 102a in the radial direction. Due to such diameter setup, the connection part 183 and the loose fit portion 184d which is a specific portion of the screw part 184 are loosely inserted in the loose fit hole 103, as a "loose fit part" prepared between the plate side fitting part 182 and the engagement portion 184e which is the remaining portion of the screw part 184, through the cylindrical clearance 103a which is relatively large.

The screw hole 104 is formed in the shape of a female thread, coaxially adjoins on the loose fit hole 103. The screw hole 104 is extended in the bearing plate 13 in a range adjacent to the one end 10a in the axial direction than the other end 10b. A diameter of a space between threads in the screw hole 104 is smaller than the diameter of the loose fit hole 103 located between the plate side fitting hole 102 and the screw hole 104. The diameter of the space between threads in the screw hole 104 means a diameter of a virtual cylinder in contact with the bottom of the thread root in the female thread.

The engagement portion 184e of the screw part 184, which is adjacent to the other end 18b than the loose fit portion 184d loosely fitted in the loose fit hole 103, is coaxially inserted in the screw hole 104. In this embodiment, the engagement portion 184e inserted in the screw hole 104 consists of an imperfect screw part 184c opposite from the connection part 183, and a part of the perfect screw part 184a adjacent to the imperfect screw part 184c.

Figure 8:
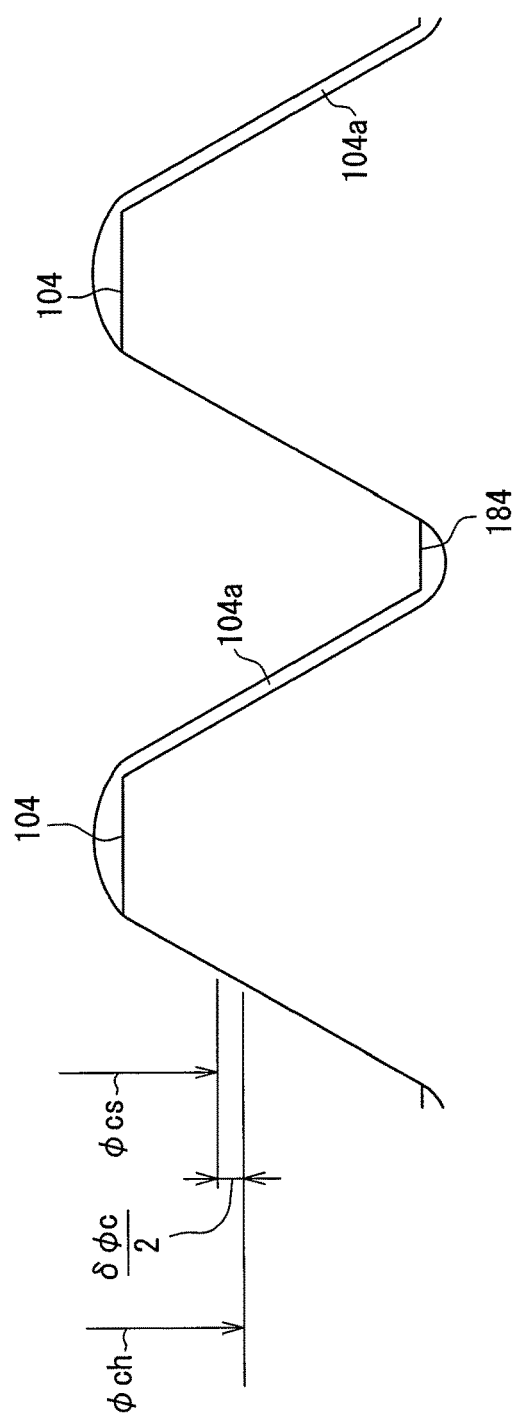
FIG. 8 is a schematic view for explaining a dimensional relation of the connection structure by the plate screw component of FIG. 1.

Under such insertion state, the effective diameter of the screw hole 104 is set larger than the effective diameter of the screw part 184 only by a spiral clearance 104a (refer to FIG. 8). The spiral clearance 104a is sufficiently smaller than the cylindrical clearance 103a in the radial direction, and is secured slightly larger than the minute clearance 102a. The effective diameter of the screw hole 104 means a diameter of a virtual cylinder where a width of a space between threads is equal to a width of a thread in a female thread. Furthermore, the effective diameter of the screw part 184 means a diameter of a virtual cylinder where a width of a space between threads is equal to a width of a thread in a male thread. Due to such diameter setup, the engagement portion 184e of the screw part 184 adjacent to the other end 18b than the loose fit portion 184d is engaged with the screw hole 104 through the spiral clearance 104a (refer to FIG. 8).

The screw side fitting hole 105 is formed in the shape of a cylindrical bore, coaxially adjoins on the screw hole 104. The screw side fitting hole 105 is located opposite from the loose fit hole 103 and the plate side fitting hole 102 across the screw hole 104. The screw side fitting hole 105 has a diameter approximately uniform in the axial direction, and is extended straightly in the axial direction, at a portion of the bearing plate 13 which defines the other end 10b. The diameter of the screw side fitting hole 105 is set smaller than the diameter of the top of the thread crest in the screw hole 104. The diameter of the top of the thread crest in the screw hole 104 means a diameter of a virtual cylinder in contact with the top of the thread crest in a female thread.

The screw side fitting part 185 is coaxially inserted in the screw side fitting hole 105. Under this insertion state, the diameter of the screw side fitting hole 105 is set larger than the diameter of the screw side fitting part 185 only by a minute clearance 105a (refer to FIGS. 4 and 9). Due to such diameter setup, the screw side fitting part 185 is aligned with the screw side fitting hole 105 by being fitted into the screw side fitting hole 105. Then, the minute clearance 105a is secured as a fitting clearance for permitting the alignment function between the screw side fitting part 185 and the screw side fitting hole 105. The minute clearance 105a is secured sufficiently smaller than the cylindrical clearance 103a and slightly smaller than the spiral clearance 104a in the radial direction. However, the minute clearance 105a may be smaller, larger, or equal to the minute clearance 102a in the radial direction.

Characteristic dimensional relations are satisfied between the outer rotor 10 having the holes 101, 102, 103, 104, 105 and the plate screw component 18 having the elements 180, 181, 182, 183, 184, 185. The dimensional relations are explained below.

Figure 6:
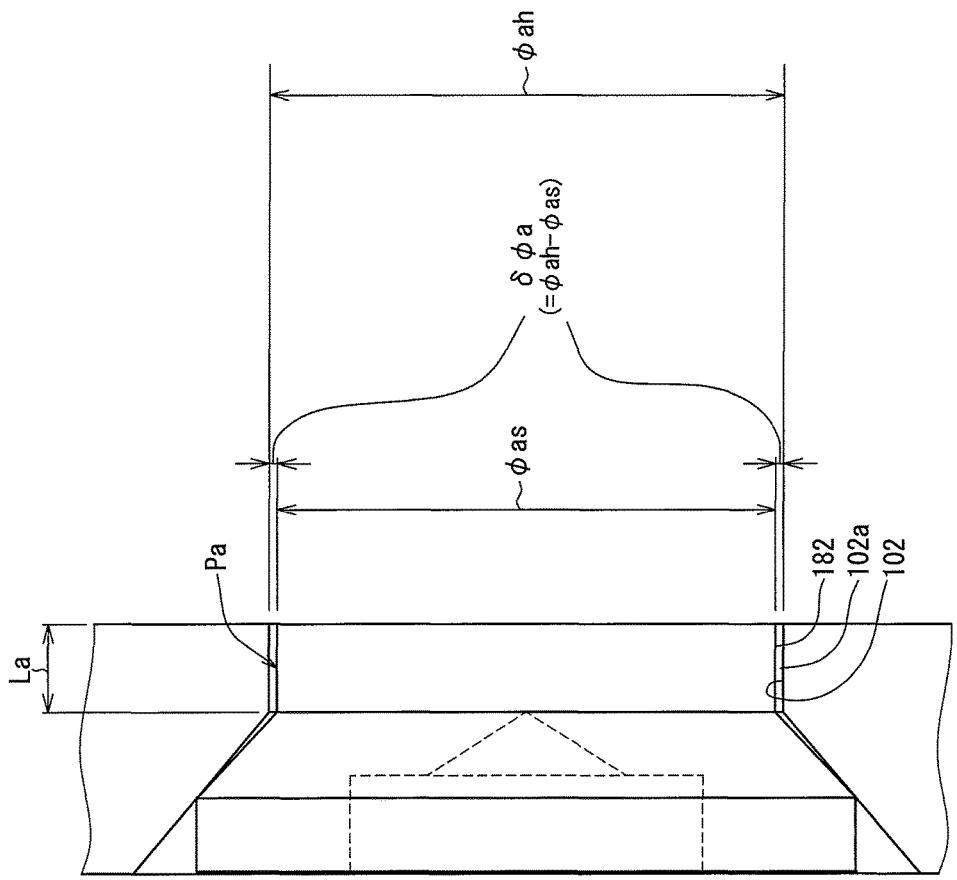
FIG. 6 is a schematic view for explaining a dimensional relation of the connection structure by the plate screw component of FIG. 1.
Figure 9:
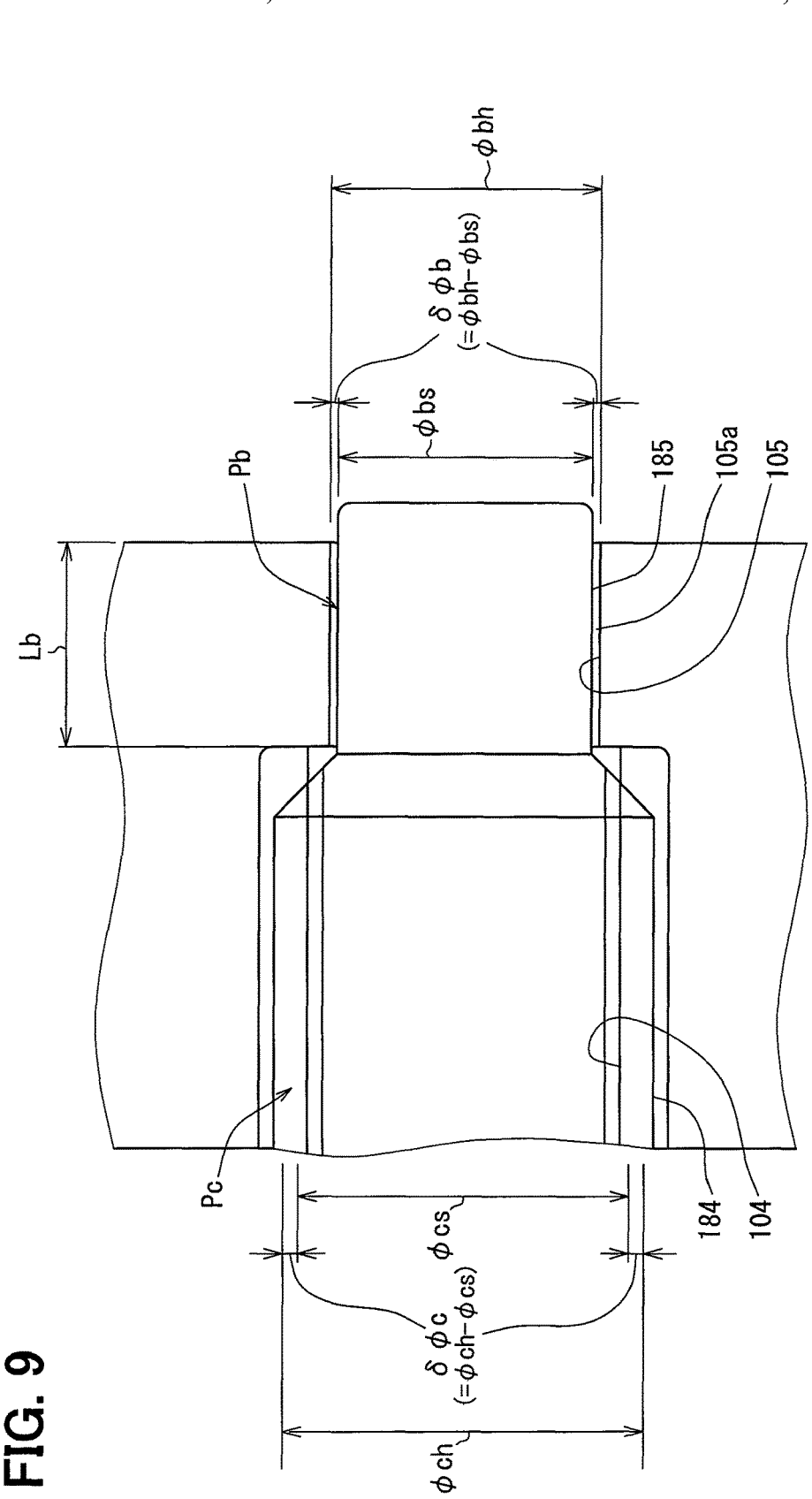
FIG. 9 is a schematic view for explaining a dimensional relation of the connection structure by the plate screw component of FIG. 1.

As shown in FIG. 6, when the diameter of the plate side fitting hole 102 is expressed as φah, and when the diameter of the plate side fitting part 182 is expressed as φas, the diameter difference δφa between the plate side fitting hole 102 and the plate side fitting part 182 is defined by the following formula 1. As shown in FIG. 9, when the diameter of the screw side fitting hole 105 is expressed as φbh and when the diameter of the screw side fitting part 185 is expressed as φbs, the diameter difference δφb between the screw side fitting hole 105 and the screw side fitting part 185 is defined by the following formula 2. As shown in FIGS. 8 and 9, when the effective diameter of the screw hole 104 is expressed as φch, and when the effective diameter of the engagement portion 184e of the screw part 184 to the hole 104 is expressed as φcs, the effective diameter difference δφc between the screw hole 104 and the screw part 184 is defined by the following formula 3. In FIG. 8, a half value δφc/2 of the effective diameter difference δφc in an ideal configuration is shown. As shown in FIG. 7, when the diameter of the loose fit hole 103 is expressed as φdh, and when the diameter of the crest in the loose fit portion 184d of the screw part 184 to the hole 103 is expressed as φds as the maximum diameter of a "loose fit part," the diameter difference δφd between the loose fit hole 103 and the "loose fit part" is defined by the following formula 4.

$$\delta\varphi a = \varphi ah - \varphi as \quad \text{(formula 1)}$$

$$\delta\varphi b = \varphi bh - \varphi bs \quad \text{(formula 2)}$$

$$\delta\varphi c = \varphi ch - \varphi cs \quad \text{(formula 3)}$$

$$\delta\varphi d = \varphi dh - \varphi ds \quad \text{(formula 4)}$$

The diameter difference δφa and the effective diameter difference δφc are set to satisfy a dimensional relation of the following formula 5 under such a definition. Further, the diameter difference δφb and the effective diameter difference δφc are set to satisfy a dimensional relation of the following formula 6. Furthermore, the effective diameter difference δφc and the diameter difference δφd are set to satisfy a dimensional relation of the following formula 7. In addition, a dimensional relation between the diameter difference δφa and the diameter difference δφb is set based on the large/small relation between the minute clearance 102a and the minute clearance 105a.

$$\delta\varphi a < \delta\varphi c \quad \text{(formula 5)}$$

$$\delta\varphi b < \delta\varphi c \quad \text{(formula 6)}$$

$$\delta\varphi c < \delta\varphi d \quad \text{(formula 7)}$$

As shown in FIGS. 4, 6, and 9, the plate side fitting part 182 and the screw side fitting part 185 are respectively fitted to the plate side fitting hole 102 and the screw side fitting hole 105, thereby respectively forming a plate side fitting area Pa and a screw side fitting area Pb. In this embodiment, the plate side fitting area Pa between the plate side fitting hole 102 and the plate side fitting part 182 is located distant from a screw area Pc between the screw hole 104 and the screw part 184 than the screw side fitting area Pb between the screw side fitting hole 105 and the screw side fitting part 185 is.

As shown in FIG. 6, the axial length where the plate side fitting hole 102 is actually fitted with the plate side fitting part 182 is defined as a fitting length La of the plate side fitting area Pa. As shown in FIG. 9, the axial length where the screw side fitting hole 105 is actually fitted with the screw side fitting part 185 is defined as a fitting length Lb of the screw side fitting area Pb. Under these definitions, the fitting length La of the plate side fitting area Pa between the plate side fitting hole 102 and the plate side fitting part 182, and the fitting length Lb of the screw side fitting area Pb between the screw side fitting hole 105 and the screw side fitting part 185 are set to satisfy a dimensional relation of the following formula 8.

$$La < Lb \quad \text{(formula 8)}$$

(Production Method)

Next, a method of manufacturing the device 1 is explained, in which the outer rotor 10 is defined as a "composite structure" housing the inner rotor 20 inside.

First, as shown in (a) of FIG. 10, the bearing plate 13 and the cover plate 14 are set to overlap with the respective sides of the timing sprocket 12 in the axial direction, in which the inner rotor 20 is coaxially arranged.

Next, as shown in (b), (c), and (d) of FIG. 10, the timing sprocket 12 and the plates 13 and 14 are connected by the plate screw component 18. Specifically, a star-shaped stick spanner is inserted in the star-shaped hole 180b. While the plate screw component 18 is screwed, the plate screw component 18 is inserted in order of the holes 101, 102, 103, 104, and 105 from the screw side fitting part 185.

After starting the screwing of the screw part 184 to the screw hole 104, in this embodiment, as the result, as shown in (b) of FIG. 10, the screw side fitting part 185 is fitted to and aligned with the screw side fitting hole 105. At this time, since the screw side fitting part 185 is allowed to deviate in a white blank arrow direction shown in (b) of FIG. 10 within the range of the spiral clearance 104a, the screw side fitting part 185 is easy to align with the screw side fitting hole 105.

When the insertion of the plate screw component 18 progresses, as shown in (c) of FIG. 10, the plate side fitting part 182 is fitted to and aligned with the plate side fitting hole 102, while the screw side fitting part 185 maintains the alignment with the screw side fitting hole 105. At this time, the plate side fitting part 182 is allowed to deviate in a white blank arrow direction shown in (c) of FIG. 10 within the range of the spiral clearance 104a and the minute clearance 102a, the plate side fitting part 182 is easy to align with the plate side fitting hole 102.

When the insertion of the plate screw component 18 further progresses, as shown in (d) of FIG. 10, the seat part 181 is seated on the countersunk hole 101 while the fitting parts 185, 182 maintain the alignment with the fitting holes 105, 102, respectively. The manufacture of the device 1 is completed by doing the above connection work for all the plate screw components 18. As shown in FIG. 1, the device 1 becomes usable after connecting the inner rotor 20 to the camshaft 2 disposed in the central hole 130 of the bearing plate 13, and connecting the timing sprocket 12 to the crankshaft.

(Action and Effect)

The action and effect of the device 1 is explained below.

The screw part 184 shaped in a male thread in the plate screw component 18 is engaged with the screw hole 104 shaped in a female thread in the bearing plate 13, such that the seat part 181 shaped in a taper surface in the plate screw component 18 is seated on the countersunk hole 101 shaped in a taper bore in the cover plate 14, in the device 1. Thereby, the cover plate 14 and the bearing plate 13 are connected with each other. At the time of this connection, the plate side fitting part 182 and the screw side fitting part 185 of the plate screw component 18 are respectively fitted to the plate side fitting hole 102 of the cover plate 14 and the screw side fitting hole 105 of the bearing plate 13 individually, such that the alignment becomes possible relative to the fitting holes 102, 105.

According to the device 1, the diameter difference $\delta\phi a$ between the plate side fitting hole 102 and the plate side fitting part 182, the diameter difference 841D between the screw side fitting hole 105 and the screw side fitting part 185, and the effective diameter difference $\delta\phi c$ between the screw hole 104 and the screw part 184 satisfy the dimensional relation $\delta\phi a<\delta\phi c$ and $\delta\phi b<\delta\phi c$. As a result, the alignment function achieved by the fitting parts 182, 185 respectively fitting to the fitting holes 102, 105 is hardly affected by the engagement between the screw hole 104 and the screw part 184. Therefore, according to such alignment function, the plate side fitting hole 102 and the screw side fitting hole 105 can be aligned with each other through the plate screw component 18. Thus, the countersunk hole 101 and the screw hole 104 can be aligned with each other.

Thus, in the device 1, the inclination of the plate screw component 18 to the holes 101, 104 can be restricted by the alignment between the countersunk hole 101 and the screw hole 104 while the cover plate 14 and the bearing plate 13 are fixed with each other by the plate screw component 18. Therefore, the alignment work between the countersunk hole 101 and the screw hole 104 before the connection can be omitted to improve the productivity, and it is possible to secure the tightening axial tension by restricting the inclination of the plate screw component 18 to improve the durability.

Furthermore, in the device 1, the plate side fitting part 182 and the screw side fitting part 185 each having the straight cylindrical shape are respectively fitted with the plate side fitting hole 102 and the screw side fitting hole 105 each having the straight cylindrical bore shape, thereby being able to align correctly to the fitting holes 102, 105. Accordingly, the accuracy of the alignment between the plate side fitting hole 102 and the screw side fitting hole 105 through the plate screw component 18 can be raised, therefore, the accuracy of the alignment between the countersunk hole 101 and the screw hole 104 can be raised. This is effective especially for improving the durability by restricting the inclination of the plate screw component 18 to secure the tightening axial tension.

Furthermore, according to the device 1, the plate screw component 18 has the connection part 183 and the loose fit portion 184$d$ of the screw part 184, as the "loose fit part" between the plate side fitting part 182 and the engagement portion 184$e$ of the screw part 184 engaged with the screw hole 104. When the screw part 184 is inserted in the screw hole 104, the "loose fit part" is loosely fitted in the loose fit hole 103 of the timing sprocket 12 at the location between the plate side fitting hole 102 and the screw hole 104 until the seat part 181 is seated on the countersunk hole 101. Thereby, the timing sprocket 12 is fixed in the state where the timing sprocket 12 is inserted between the cover plate 14 having the plate side fitting hole 102 and the bearing plate 13 having the screw hole 104. At the time of this connection, the plate side fitting part 182 and the screw side fitting part 185 of the plate screw component 18 are respectively fitted with the plate side fitting hole 102 of the cover plate 14 and the screw side fitting hole 105 of the bearing plate 13, such that the alignment becomes possible relative to the fitting holes 102, 105.

According to the device 1, the effective diameter difference $\delta\phi c$ between the screw hole 104 and the screw part 184, and the diameter difference $\delta\phi d$ between the loose fit hole 103 and the "loose fit part" satisfy the dimensional relation of $\delta\phi c<\delta\phi d$. As a result, the alignment function of the fitting part 182, 185 fitted to the fitting hole 102, 105 individually is hardly affected by the loose fit of the "loose fit part" to the loose fit hole 103. Therefore, high productivity and high durability are compatible when the outer rotor 10 is defined as a "composite structure" in which the timing sprocket 12 is interposed as a separate component between the cover plate 14 and the bearing plate 13.

In addition, according to the device 1, the plate side fitting area Pa between the plate side fitting hole 102 and the plate side fitting part 182 is located distant from the screw area Pc between the screw hole 104 and the screw part 184 than the screw side fitting area Pb between the screw side fitting hole 105 and the screw side fitting part 185 is. As a result, the allowable deviation range of the plate screw component 18 to the bearing plate 13 can be increased at the time of connection in the plate side fitting area Pa distant from the screw area Pc than the screw side fitting area Pb is. Accordingly, the plate side fitting part 182 can easily align with the plate side fitting hole 102 because the plate screw component 18 is movable within the wide range to the bearing plate 13. The easy alignment is effective especially for improving the productivity.

Moreover, according to the device 1, the fitting length La of the plate side fitting area Pa between the plate side fitting hole 102 and the plate side fitting part 182, and the fitting length Lb of the screw side fitting area Pb between the screw side fitting hole 105 and the screw side fitting part 185 satisfy the dimensional relation of La<Lb. As a result, the allowable deviation range of the plate screw component 18 to the cover plate 14 can be increased at the time of connection in the plate side fitting area Pa distant from the screw area Pc than the screw side fitting area Pb is. Accordingly, the plate side fitting part 182 can easily align with the plate side fitting hole 102, and the accuracy of the alignment can be secured, since the plate screw component 18 is movable within the wide range to the cover plate 14 and the bearing plate 13. Therefore, the easy alignment and the alignment accuracy are effective especially for improving both the productivity and the durability.

Furthermore, according to the device 1, the outer rotor 10 is produced as a "composite structure" for relatively rotating the inner rotor 20 which rotates with the camshaft 2 inside of the outer rotor 10 which rotates with the crankshaft. The productivity can be improved when the outer rotor 10 is produced as a "composite structure" housing the inner rotor 20 inside, and the durability can be improved after the production.

Other Embodiment

Although the embodiment is described, the present disclosure is not interpreted to be limited to the embodiment, and can be applied to various embodiments within a range not deviated from the scope of the present disclosure.

Figure 11:
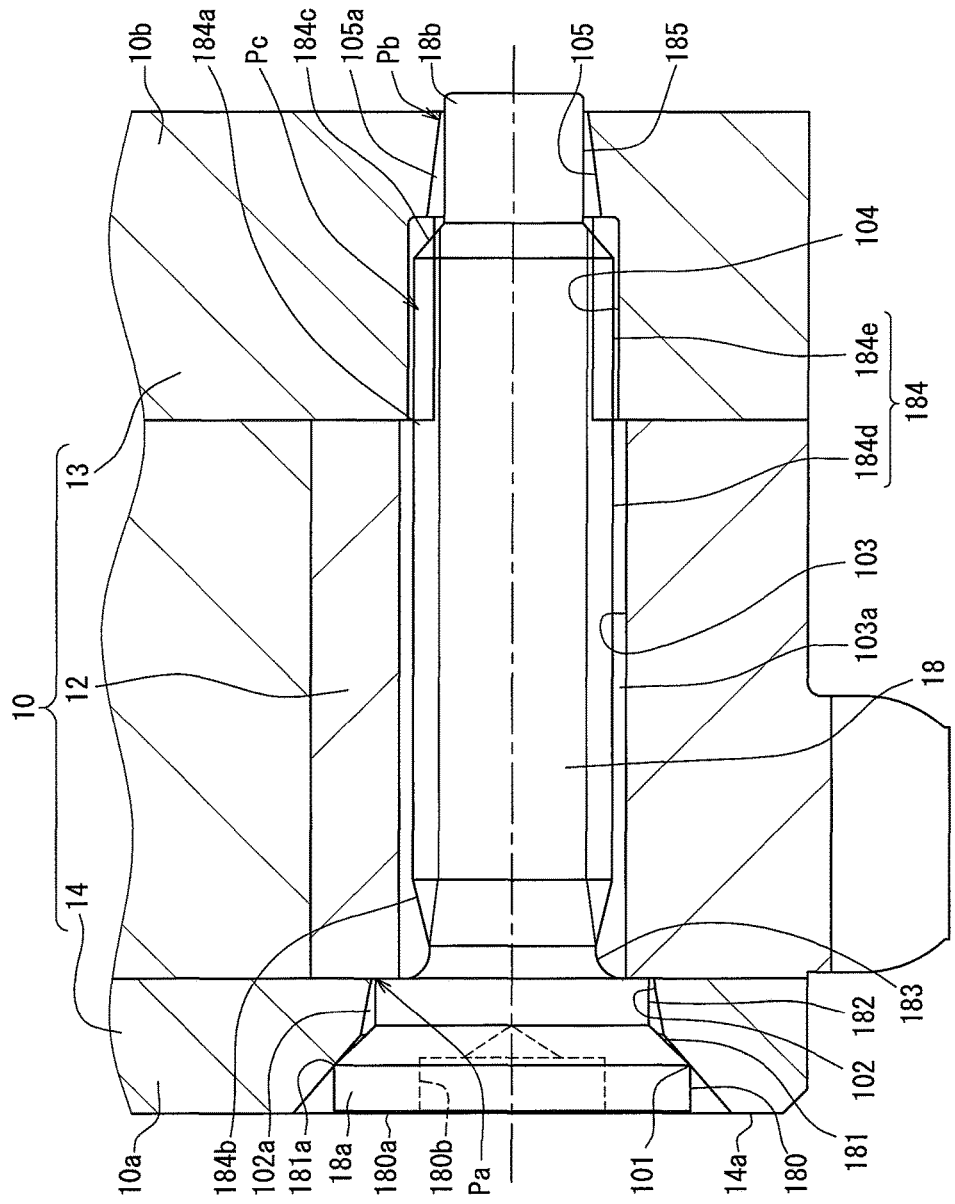
FIG. 11 is a sectional view illustrating a modification in FIG. 4.

Specifically, in a first modification, as shown in FIG. 11, at least one of the plate side fitting hole 102 and the screw side fitting hole 105 may be formed in the shape of a taper bore. At this time, the minimum value of the diameter difference between the plate side fitting part 182 and the plate side fitting hole 102 shaped in the taper bore is defined as $\delta\phi a$ in the plate side fitting area Pa. Moreover, the minimum value of the diameter difference between the screw side fitting part 185 and the screw side fitting hole 105 shaped in the taper bore is defined as $\delta\phi b$ in the screw side fitting area Pb. In the first modification shown in FIG. 11, both of the plate side fitting hole 102 and the screw side fitting hole 105 are formed in the shape of a taper bore.

Figure 12:
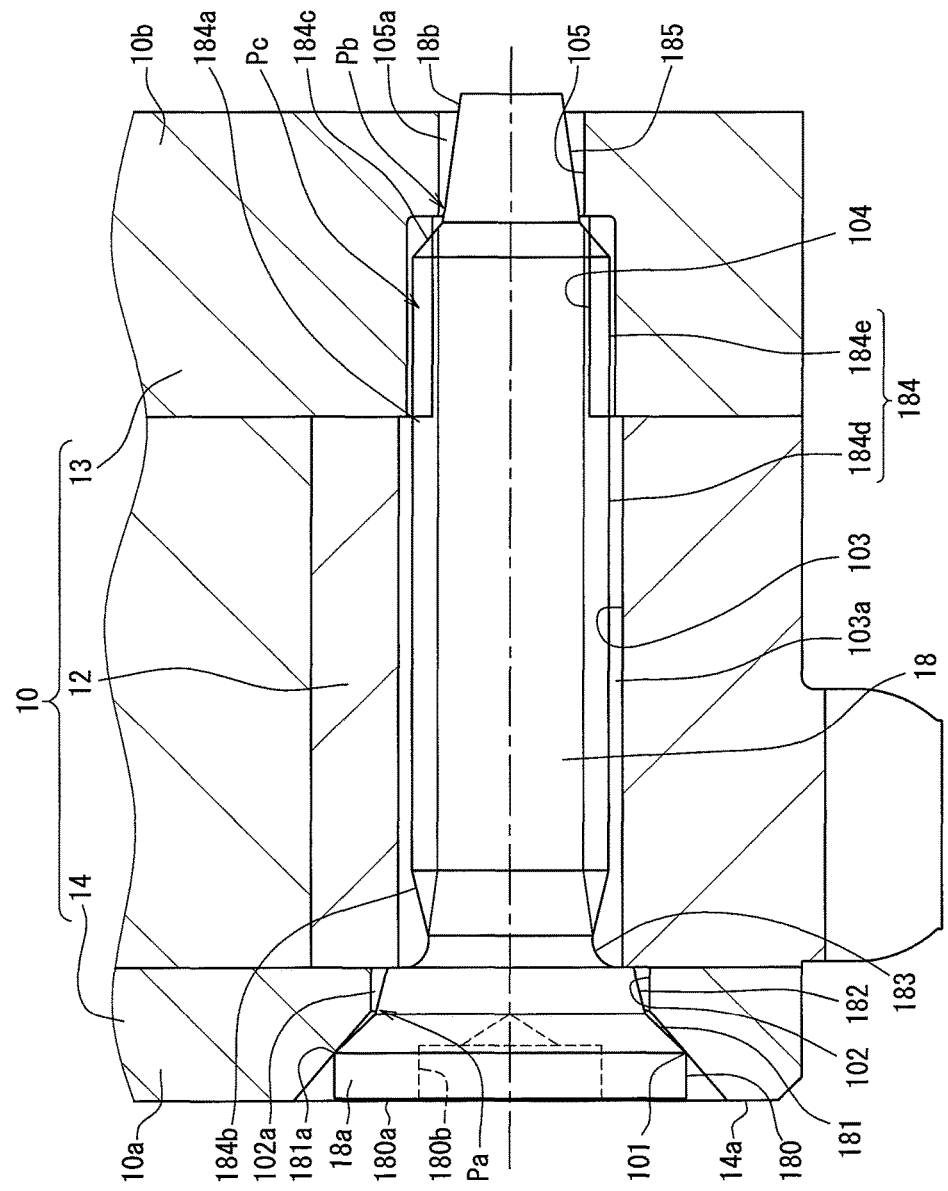
FIG. 12 is a sectional view illustrating a modification in FIG. 4.

As shown in FIG. 12, in a second modification, at least one of the plate side fitting part 182 and the screw side fitting part 185 may be formed in the shape of a taper cylindrical column. At this time, the minimum value of the diameter difference between the plate side fitting hole 102 and the plate side fitting part 182 shaped in the taper cylindrical column is defined as $\delta\phi a$ in the plate side fitting area Pa. Moreover, the minimum value of the diameter difference between the screw side fitting hole 105 and the screw side fitting part 185 shaped in the taper cylindrical column is defined as $\delta\phi b$ in the screw side fitting area Pb. In the second modification shown in FIG. 12, both of the plate side fitting part 182 and the screw side fitting part 185 are formed in the shape of a taper bore.

In a third modification, the first modification and the second modification may be combined with each other. In a fourth modification, the fitting length La of the plate side fitting area Pa, and the fitting length Lb of the screw side fitting area Pb may be set to a value which satisfies the dimensional relation of La>Lb.

Figure 13:
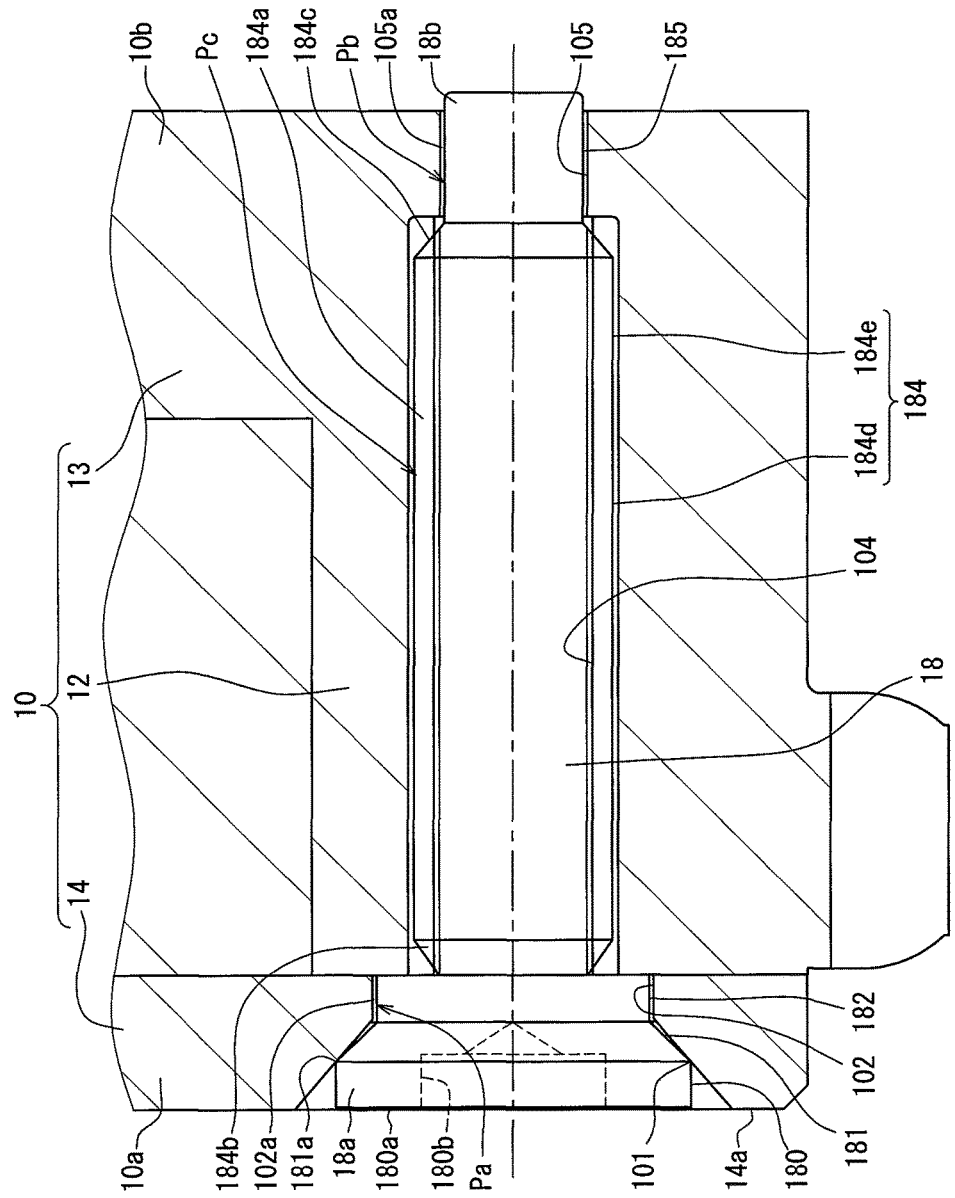
FIG. 13 is a sectional view illustrating a modification in FIG. 4.

As shown in FIG. 13, in a fifth modification, the timing sprocket 12 may be formed integrally with the bearing plate 13, and the loose fit hole 103 may be changed to the screw hole 104. At this time, as shown in FIG. 13, the plate side fitting area Pa and the screw side fitting area Pb may be located to have approximately the same distance from the screw area Pc, by not forming the connection part 183.

In a sixth modification, the present disclosure may be applied to an outer rotor as a "composite structure" of valve timing adjustment device which adjusts the valve timing of exhaust valve as "valve", or may be applied to a "composite structure" different from the valve timing adjustment device.

The invention claimed is:

1. A composite structure comprising:
a countersunk hole component having a countersunk hole shaped in a tapered hole and a plate side fitting hole adjacent to a small diameter side of the countersunk hole;
a screw hole component having a screw hole shaped in a female thread and a screw side fitting hole located opposite from the plate side fitting hole through the screw hole; and
a plate screw component including a seat part having a tapered surface to be seated on the countersunk hole, a screw part shaped in a male thread and engaged with the screw hole, and a plate side fitting part and a screw side fitting part respectively fitted with the plate side fitting hole and the screw side fitting hole to be in alignment with each other, wherein
a difference $\delta\phi a$ in diameter between the plate side fitting hole and the plate side fitting part, a difference $\delta\phi b$ in diameter between the screw side fitting hole and the screw side fitting part, and an effective difference $\delta\phi c$ in diameter between the screw hole and the screw part satisfy a dimensional relation of $\delta\phi a<\delta\phi c$ and $\delta\phi b<\delta\phi c$.

2. The composite structure according to claim 1, wherein
the plate side fitting hole and the screw side fitting hole are formed to have straight cylindrical bore shape, and
the plate side fitting part and the screw side fitting part are formed to have straight cylindrical column shape.

3. The composite structure according to claim 1, further comprising:
a loose fit hole component having a loose fit hole defined between the plate side fitting hole and the screw hole, wherein
the plate screw component has a loose fit part between the plate side fitting part and the screw part to be loosely fitted in the loose fit hole, and
the effective difference $\delta\phi c$ in diameter between the screw hole and the screw part, and a difference $\delta\phi d$ in diameter between the loose fit hole and the loose fit part satisfy a dimensional relation of $\delta\phi c<\delta\phi d$.

4. The composite structure according to claim 1, wherein
a plate side fitting area between the plate side fitting hole and the plate side fitting part is located more distant from a screw area between the screw hole and the screw part than a screw side fitting area between the screw side fitting hole and the screw side fitting part is.

5. The composite structure according to claim 1, wherein
a fitting length La of a plate side fitting area between the plate side fitting hole and the plate side fitting part, and a fitting length Lb of a screw side fitting area between the screw side fitting hole and the screw side fitting part satisfy a dimensional relation of La<Lb.

6. A valve timing adjustment device that adjusts valve timing of a valve opening and closing a camshaft in an internal-combustion engine by a crank torque from a crankshaft, the valve timing adjustment device comprising:
an outer rotor defined by the composite structure according to claim 1, the outer rotor rotating with the crankshaft; and
an inner rotor housed in the outer rotor to relatively rotate, the inner rotor rotating with the camshaft.

* * * * *